(12) United States Patent
Nielsen

(10) Patent No.: US 10,718,494 B1
(45) Date of Patent: Jul. 21, 2020

(54) PAN/TILT LIMITATION METHOD

(71) Applicant: Harman Professional Denmark ApS, Aarhus N (DK)

(72) Inventor: Christian Quist Nielsen, Aalborg Øst (DK)

(73) Assignee: HARMAN PROFESSIONAL DENMARK APS, Aarhus (DK)

(*) Notice: Subject to any disclaimer, the term of this patent is extended or adjusted under 35 U.S.C. 154(b) by 0 days.

(21) Appl. No.: 16/774,256

(22) Filed: Jan. 28, 2020

(30) Foreign Application Priority Data

Feb. 8, 2019 (EP) .................................. 19156117

(51) Int. Cl.
*F21V 14/02* (2006.01)
*F21S 8/00* (2006.01)
*G05B 19/402* (2006.01)
*H05B 47/10* (2020.01)
*F21V 21/30* (2006.01)

(52) U.S. Cl.
CPC .............. *F21V 14/02* (2013.01); *F21S 8/003* (2013.01); *F21V 21/30* (2013.01); *G05B 19/402* (2013.01); *H05B 47/10* (2020.01); *G05B 2219/36447* (2013.01)

(58) Field of Classification Search
CPC ....... F21V 14/02; F21V 21/30; G05B 19/402; G05B 2219/36447; F21S 8/003; H05B 47/10; F21W 2131/406; F21W 2131/105
See application file for complete search history.

(56) References Cited

U.S. PATENT DOCUMENTS

| | | | |
|---|---|---|---|
| 2005/0243549 A1* | 11/2005 | Ruston | F21S 2/00 362/233 |
| 2010/0204841 A1* | 8/2010 | Chemel | H05B 45/20 700/282 |
| 2018/0224100 A1* | 8/2018 | Farnik | F21V 14/02 |
| 2018/0292809 A1 | 10/2018 | Farnik et al. | |

FOREIGN PATENT DOCUMENTS

| WO | 2013139338 A1 | 9/2013 |
|---|---|---|
| WO | 2016079308 A1 | 5/2016 |

OTHER PUBLICATIONS

European Patent Office, Extended European Search Report Issued in Application No. 19156117.4, dated Apr. 15, 2019, Germany, 5 pages.

\* cited by examiner

*Primary Examiner* — Peggy A Neils
(74) *Attorney, Agent, or Firm* — McCoy Russell LLP

(57) ABSTRACT

The invention relates to a moving head light fixture including a base, a yoke connected to the base and configured to be rotated relative to the base around a pan axis, a head connected to the yoke and configured to be rotated relative to the yoke around a tilt axis, and a control unit. The control unit is configured to operate the moving head light fixture in a calibration mode to determine a maximum needed rotation around the tilt and pan axis in order to illuminate a target area, and to operate in an operating mode in which the moving head light fixture illuminates the target area only within the maximum needed rotation.

15 Claims, 4 Drawing Sheets

PAN/TILT LIMITATION METHOD

CROSS REFERENCE TO RELATED APPLICATIONS

The present application claims priority to European Application No. 19156117.4, filed on Feb. 8, 2019. The entire contents of the above-identified application are hereby incorporated by reference for all purposes.

TECHNICAL FIELD

The present application relates to a moving head light fixture and to a method for operating the moving head light fixture.

BACKGROUND

Moving head lighting fixtures are commonly known in the art of lighting and especially in connection with entertainment lighting. A moving head light fixture typically comprises a head having a number of light sources creating a light beam and a number of light effect elements with which various light effects can be generated. The head is rotatably connected to a yoke and the yoke is rotatably connected to a base. As a result the head can be panned and tilted around a pan axis and a tilt axis so that the light beam can be directed in many directions. Typically the moving head light fixture allows an angular position of the yoke relative to the base between 0 and 540°, meaning that the yoke can be rotated 1½ revolutions relative to the base. Similarly the head can be moved relative to the yoke in a theoretical angle of 0 to 270°. However the exact numbers depend on the kind of light fixture use and the allowed angles might be larger or smaller than the angles indicated above.

In most cases the area that is to be illuminated by the moving head light fixture is limited, e.g. to an area such as a dance floor or a stage area.

Normally software tools are used to control the operation of the moving head light fixture, especially how the head is moved relative to the yoke and the base. The software used to control the moving of the light beam is normally not aware of the exact dimensions of the location where the moving head light fixture is installed. Accordingly the situation often occurs that the moving head light fixture is illuminating part of the environment not related to the scene to be illuminated. This is disadvantageous as first of all parts of the environment are illuminated which should not be illuminated and the scene that should be illuminated is not illuminated the whole time.

SUMMARY

Accordingly a need exists to overcome the above mentioned problems and to be able to easily adapt the movement of the moving head light fixture to the current environment.

This need is met by the features of the independent claims. According to a first aspect a moving head light fixture is provided comprising a base and a yoke connected to the base wherein the yoke is configured to be rotated relative to the base around a pan axis. The moving head light fixture furthermore comprises a head connected to the yoke and configured to be rotated relative to the yoke around a tilt axis. The moving head light fixture furthermore comprises a control unit configured to operate the moving head light fixture in a calibration mode used to determine a maximum needed rotation around the tilt and pan axis in order to illuminate a target area and is configured to be operated in an operating mode in which the moving head light fixture actually illuminates the target area within the maximum needed rotation. The control unit is furthermore configured to control the movement of the yoke around the pan axis and of the head around the tilt axis and is configured to determine that the calibration mode should be entered upon an interaction of the user of the moving head light fixture. In the calibration operating mode the control unit is configured to determine a minimum pan rotation angle of the yoke around the pan axis upon detecting that the user has moved the moving head light fixture to a first position, and to determine a maximum pan rotation angle of the yoke around the pan axis upon detecting that the user has moved the moving head light fixture to a second position. Additionally the control unit is configured to determine a minimum tilt rotation angle of the head around the tilt axis upon detecting that the user has moved the moving head light fixture to a third position and configured to determine a maximum tilt rotation angle of the head around the tilt axis upon detecting that the user has moved the moving light fixture to a forth position. The control unit is further configured, when operating in the operating mode to limit a rotation of the yoke around the pan axis to pan rotation angles in a range between the minimum pan and the rotation of the head around the tilt axis to tilt rotation angles in a range between the minimum tilt and the maximum tilt rotation angle independent of a control signal provided to the control unit for controlling the movement of the yoke and head.

The moving head light fixture comprises different operating modes and in the calibration operating mode the user can easily determine the range of the pan rotation angle and the range of the tilt rotation angle by moving the head light fixture to the different positions which should correspond to the maximum and minimum pan rotation angles and maximum and minimum tilt rotation angles, respectively. In the operating mode the head can then be rotated only within the defined range of rotation angles so that it can be made sure that only a certain area is illuminated by the moving head light fixture independent of the fact which control signals are received for controlling the yoke and the head.

It is possible to configure the control unit in such a way that in the calibration mode the head and the yoke can be moved with a resistance which is smaller compared to the resistance that is needed to move the head and/or the yoke in the operating mode. Accordingly when the calibration operating mode is detected, an easy to move interaction is enabled, by way of example by providing an appropriate hold current which is lower compared to the hold currents applied in the operating mode.

Furthermore the control unit can be configured to determine that the calibration mode is entered when a first user interaction is detected, and the position of the head and of the yoke is determined as minimum pan rotation angle and minimum tilt rotation angle upon detecting that the user has moved the moving head light fixture to a single first position corresponding to the first and third positions mentioned above when a second predefined user interaction is detected.

Here a first predefined user interaction such as the pressing of an operating element may be detected to determine that the calibration mode should be entered and when the moving head light fixture is moved to the closest corner of the target area and a second predefined user interaction is detected, the minimum pan rotation angle and the minimum tilt rotation angle are set.

In the same way the position of the head and of the yoke can be detected as maximum pan rotation angle and maximum tilt rotation angle upon detecting that the user has moved the moving head light fixture to a single second position which corresponds to the second and forth position indicated above when another predefined user interaction is detected.

The moving head light fixture can comprise two different operating elements which can be operated by the user when the user has moved the moving head light fixture to the first single position and the first operating element is operated by the user so that the minimum tilt and pan rotation angles are set. In the same way, when the user moves the moving head light fixture to a second single position the corresponding maximum pan and maximum tilt rotation angle can be determined by the control unit when a second operating element is operated by the user.

The operating element may be a mechanically operated element or a virtual operating element displayed on a display.

Furthermore the corresponding method for operating the moving head light fixture is provided in which it is determined that the calibration mode should be entered upon an interaction of the user of the moving head light fixture. When the light fixture is operated in the calibration mode, the minimum pan rotation angle, the maximum pan rotation angle, the minimum tilt rotation angle, and the maximum tilt rotation angle are determined when it is detected that the user has moved the moving head light fixture to the different positions. In the operating mode, during illumination, the rotation is limited to the ranges between the minimum and maximum tilt rotation angles and minimum and maximum pan rotation angles.

It is to be understood that the features mentioned above and features yet to be explained below can be used not only in the respective combinations indicated but also in other combinations or in isolation without departing from the scope of the present invention. Features of the abovementioned aspects and embodiments described below may be combined with each other in other embodiments unless explicitly mentioned otherwise. Other devices, systems, methods, features and advantages will become apparent to one with skill in the art upon examination of the following detailed description and figures.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION

Figure 1:
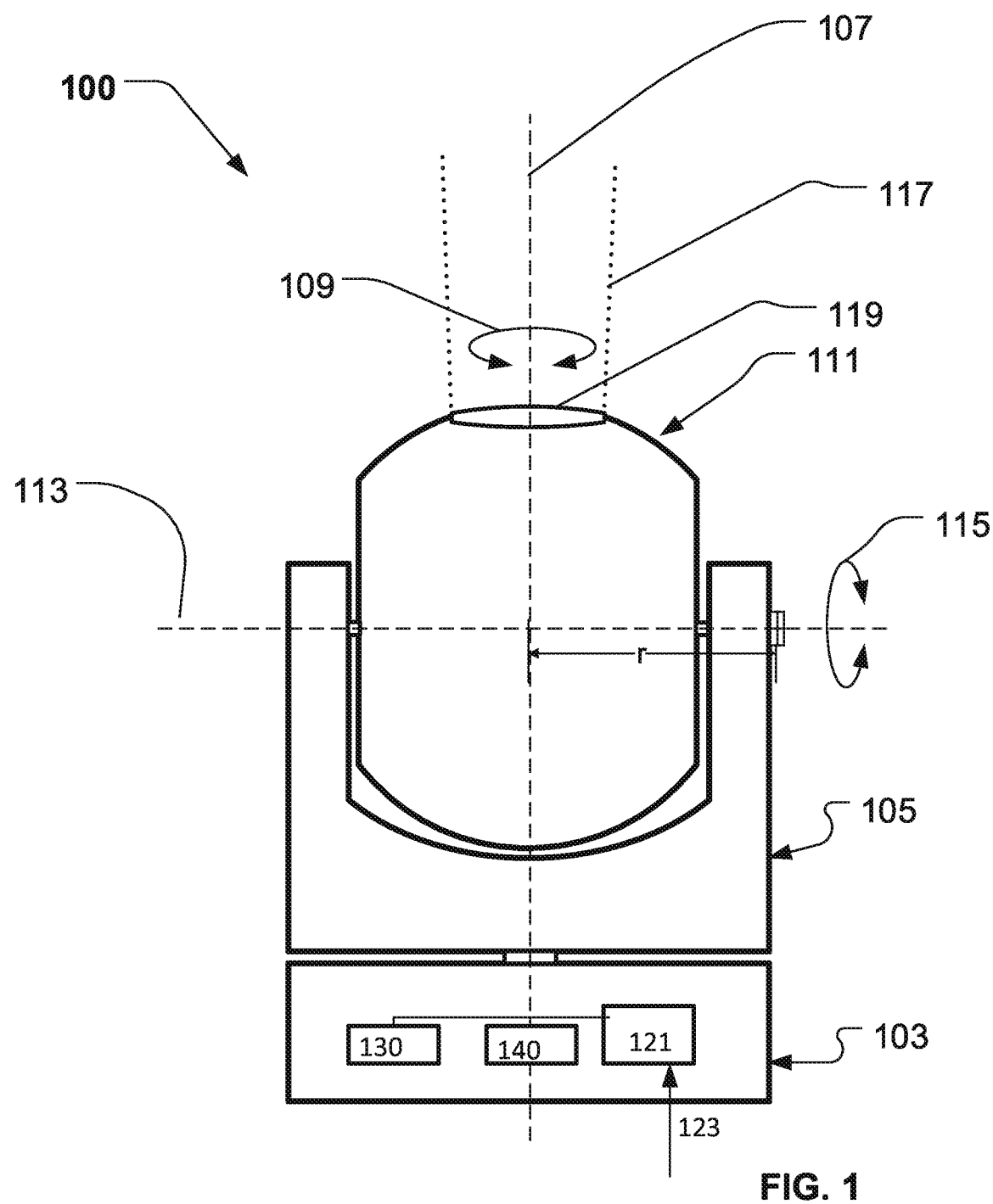
FIG. 1 shows a schematic view of a moving head light fixture wherein the movement of the head can be easily controlled in a calibration mode.

In the following, embodiments will be described in detail with reference to the accompanying drawings. It is to be understood that the following description of embodiments is not to be taken in a limiting sense. The scope of the disclosure is not intended to be limited by the embodiments described hereinafter or by the drawings, which are to be illustrative only.

The drawings are to be regarded as being schematic representations, and elements illustrated in the drawings are not necessarily shown to scale. Rather the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

FIG. 1 is a structural diagram illustrating a moving head light fixture 100. The moving head light fixture 100 comprises a base 103 rotatably connected to a yoke 105 and a head 111 rotatably carried by the yoke 105. The head comprises a plurality of light sources, not shown, generating a light beam 117 illustrated by dotted lines. The light sources are arranged inside the head 111 and the light beam exits the head through an emitting window 119. The light sources can be any kind of light sources, for instance, incandescent lamps, discharge lamps, plasma lamps, LEDs (Light Emitting Diodes), organic LEDs or polymer LEDs or a combination thereof. The emitting window can be implemented as an optical lens configured to deflect the light beam, however it should be noticed that the light emitting window can be provided as any component allowing the light beam to propagate through the head housing. Furthermore, it is possible that the light sources are arranged at the outer surface of the rotatable structure or the head. At least one actuator not shown in the figures is adapted to rotate the yoke relative to the base around a pan axis 107. Furthermore, an actuator is configured to rotate the head 111 around the yoke 105 around a tilt axis 113. The pan rotation is symbolized by arrow 109 and the tilt rotation is symbolized by arrow 115.

The moving head light fixture comprises a controller 121 which is configured to control the components in the moving head light fixture based on a number of control parameters such as light effect parameters, position parameters and other parameters related to the moving head light fixture. Light effect parameters can relate to light effects that the light beam should generate and may relate to color, dimming level, prism effects, gobo effects, animation effects, etc.

The position parameters can relate to the position of the head 111 in relation to the yoke 105 and/or the position of the yoke 105 relative to the base 103. The control parameters can be stored on a memory, not shown in the drawings, or may be received via an input signal 123. The input signal can be provided as separate signal comprising different control parameters. The input signal 123 may be received from a light controller, not shown. The moving head light fixture comprises a human machine interface enabling a user to interact directly with the moving head light fixture. The human machine interface, HMI, can for instance comprise buttons, joysticks, touchpads, keyboards, a mouse or virtual elements such as a display indicating different icons. The display can provide a menu structure shown on the display and may be implemented as a touch screen. In the embodiment shown, the human machine interface comprises a first button or operating element 130 and a second button or operating element 140.

Figure 2:
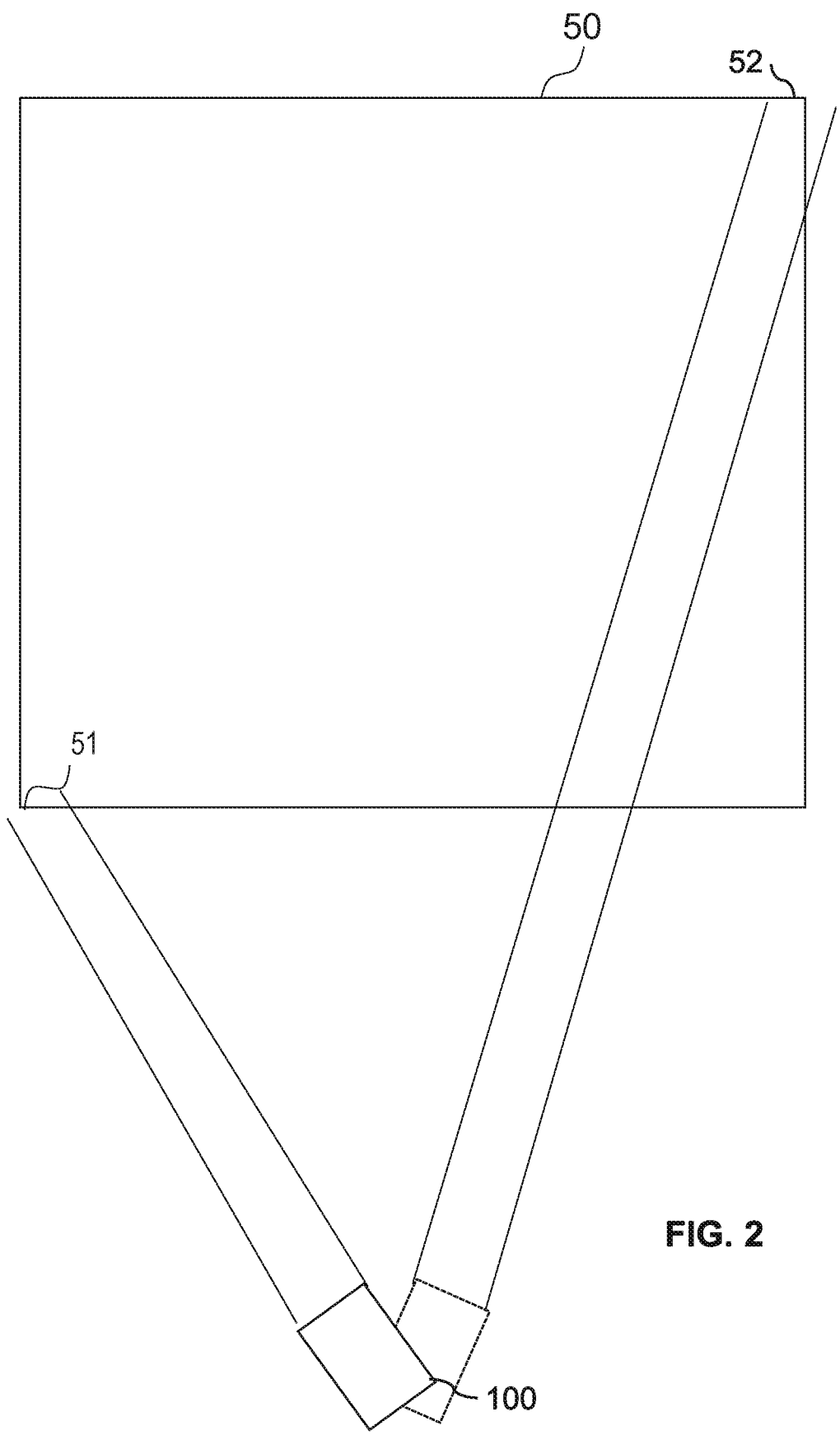
FIG. 2 shows a schematic view of how the allowed range of tilt and pan rotation angles can be easily controlled by the user with two different positions of the moving head light fixture.

In the following, a simple way to limit the pan and tilt movements for the moving head light fixture is described. When the moving head light fixture 100 is used to illuminate a target area 50 as shown in FIG. 2 such as a dance floor or stage area, the user can press a dedicated button, e.g. one of the buttons 130 and 140 which may be called a minimum button. This helps to activate a calibration mode. The user can then physically move the pan and the tilt of the light fixture until the minimum point or corner 51 of the target area is reached. Here, the tilt angle is the minimum angle needed to illuminate the target area 50 and the pan angle is the minimum angle needed to illuminate target area 50. When this minimum button, such as operating element 130, is operated, the control unit 121 can notice that a calibration mode is entered in which the user can indicate the limits of the target area to be illuminated. In this calibration mode, the motors, such as stepper motors provided in the moving head light fixture 100, have an easy to move hold current which is applied to coils provided in the moving head light fixture used to control the positioning of the different components as known in the art. This hold current can be lower compared to the situation when the moving head light fixture 100 is not in the calibration mode, but in the operating mode where the light fixture 100 illuminates the target area 50 based on control signals received via the input signal 123 or by control signals stored in the control unit 121 as shown.

Accordingly, when the user presses the minimum button, such as operating element 130, again when the corner 51 is illuminated, the control unit 121 can reset its pan and tilt position and thereby know exactly how many pan and tilt steps are needed to reach this minimum point when a step motor is used. The user can then move the moving head light fixture to another position, indicated by dotted lines in FIG. 2, in which the moving head light fixture illuminates corner 52 which represents the maximum tilt angle and the maximum pan angle. Accordingly, the user can press dedicated operating element on the light fixture, such as a maximum button or operating element 140, and then physically move the light fixture 100 until the maximum point such as corner 52 is reached. When the user then presses this maximum button or operating element 140 for the second time, the fixture 100, especially the control unit 121, will reset its pan and tilt position and thereby know exactly how many pan and tilt steps are needed to reach this maximum point.

In the embodiment discussed above two different operating elements 130 and 140 were used to set the minimum and maximum angles. It should be understood that a single operating element may be used wherein in dependence on the sequence in which the operating element is operated, the control unit 121 knows whether the minimum pan or tilt angle or maximum pan and tilt angle is set by the user.

Furthermore it is possible that four different operating elements are provided to individually set the four different angles, two maximum angles and two minimum angles.

In the embodiment of FIG. 2, two single positions were used, one to set the minimum tilt and minimum pan angle and the other position to set the maximum tilt and pan angle. However, it should be understood that also four separate positions of the moving head light fixture might be used and in each of the four positions one of the maximum and minimum tilt angles and maximum and minimum pan angles is determined. In such a situation, the moving head light fixture 100 may be controlled to separately illuminate the different edges of the target area. Furthermore, it is possible to provide a single preset position of the pan and tilt movement. This could be used by the moving head light fixture or triggered by the input signal such as a DMX signal. This preset focus point for the moving head light fixture 100 can be a mirror ball or a special place on the stage area.

When the calibration mode is left, the control unit can control the movement of the moving head light fixture 100 in such a way that the moment is limited to a range of angles delimited by the maximum and minimum tilt angle and by the maximum and minimum pan angle.

Figure 3:
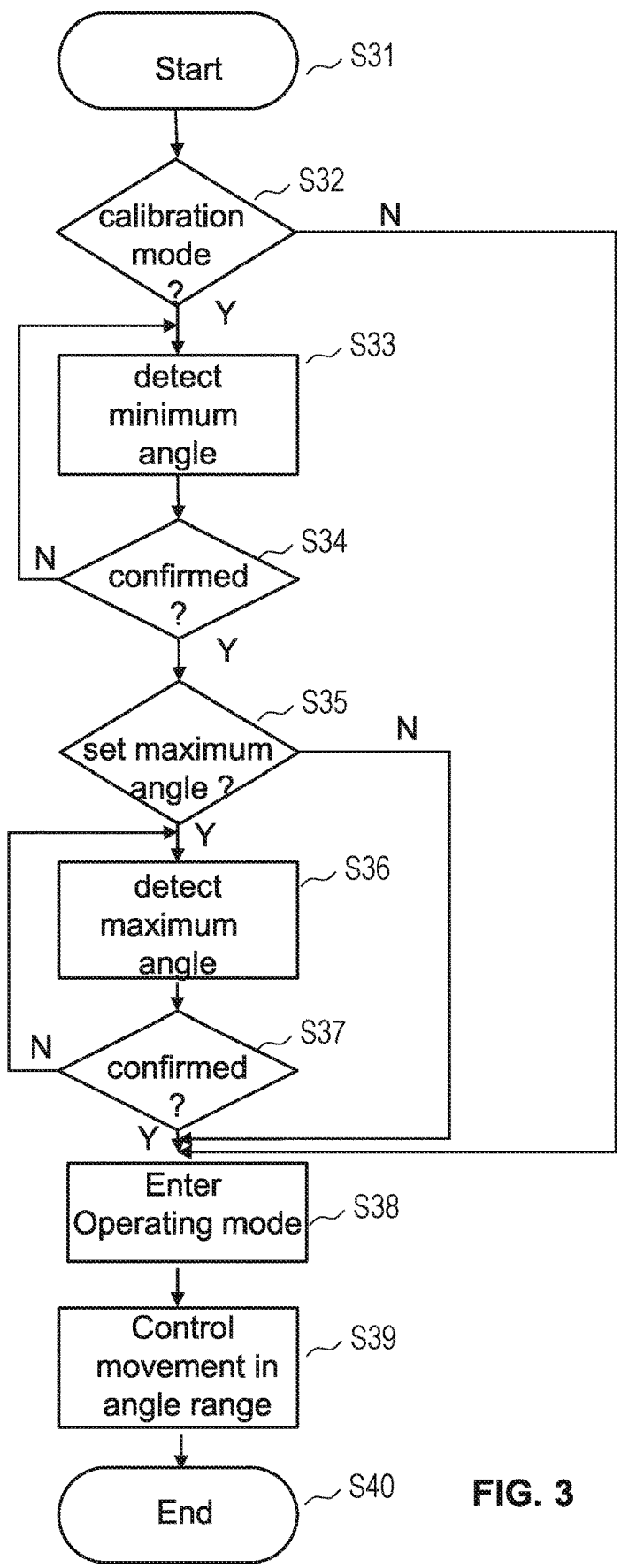
FIG. 3 shows schematically a flowchart comprising the steps carried out by the moving head light fixture for calibrating the movement of the moving head light fixture and of using the light fixture within the calibrated range.

FIG. 3 shows some of the steps that may be carried out to operate the light fixture 100 as discussed above. In step S31 the method starts and in step S32 it is detected whether the calibration mode is entered. This can be detected, by way of example when one of the operating elements such as the minimum button or maximum button is pressed by the user. When it has been detected that the calibration mode is entered in step S32 it is detected in step S33 how the user moves the moving head light fixture. When the user has reached the minimum position such as corner 51 and when the minimum angles of the tilt and pan angles are confirmed in step S34 (e.g. by again pressing the minimum button), the control unit can determine the pan and tilt steps that are needed to reach this minimum point when the motor is a step motor. If another type of motor is used, the absolute angle to reach the minimum angle is determined. In step S35 it is detected whether the maximum angles should be set, e.g. by detecting whether the maximum button/operating element has been activated. If this is the case, the angle is detected to which the user moves the light fixture, here the other corner such as corner 52 and the indicated position is detected in step S36 as maximum position when in step S37 the confirmation is received by the user, e.g. by pressing an operating element. When the user has confirmed the maximum positions (the maximum tilt and pan angle) in step S37 the control unit can deduce that the calibration mode is finished and that it should return to the operating mode in step S38. Within this operating mode the movement of the moving head light fixture, especially of the head and of the yoke is determined such that the obtained rotation angles for the pan and tilt angles do not exceed the minimum and maximum angles as determined in steps S33 to S37 (S39), if the angles have been limited. Without the calibration the angles are limited in the range of the theoretical maximum values larger than the angles determined in steps S33 to S37 above. The method ends in step S40.

Figure 4:
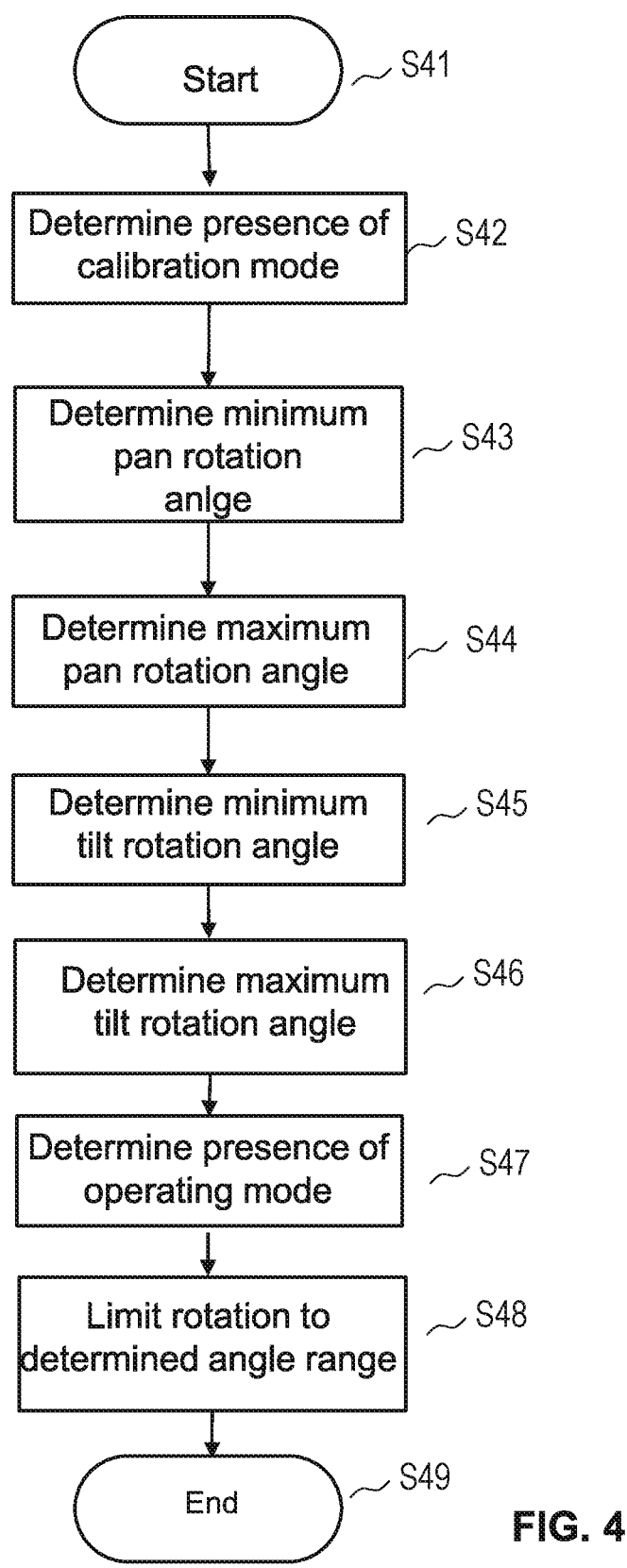
FIG. 4 shows schematically a flowchart comprising the steps that may be carried out to easily calibrate the rotation ranges of the moving head light fixture in a calibration mode.

FIG. 4 shows another embodiment of how the operation of the moving head light fixture 100 can be limited to a certain area. The method starts in step S41 and in step S42 the presence of a calibration mode is detected, e.g. by a predefined user interaction with the light fixture 100. The possibility for the interaction can be provided by dedicated hardware elements, mechanical actuators or by virtual elements shown on a display. In step S43 the minimum pan rotation angle is detected after the user has moved the light fixture 100 to a position where the desired minimum pan rotation angle is reached. This minimum pan rotation angle can then be indicated to the control unit with another user interaction. In the same way, when the user has moved the light fixture 100 to a maximum pan rotation angle, this position can be indicated to the control unit by another user interaction in step S44. In the same way the minimum tilt rotation angle and the maximum tilt rotation angle are indicated to the system by moving the light fixture 100 to the minimum tilt rotation angle as desired and by indicating it to the system by a defined user interaction (S45). The user can rotate the light fixture to the maximum tilt rotation angle and can indicate or confirm this angle to the control unit as maximum rotation angle by a user interaction such as the activation of an activating element (S46). In step S47 it is then detected that the calibration mode is left and the normal operating mode is obtained. This can be deduced when all four angles have been confirmed by the user or when another user interaction with the HMI has occurred. In steps S43 to S46 the elements needed to control the position of the head and yoke such as the stepper motors can be designed such that the moving head light fixture and the components can be moved relative to each other more easily than in the normal operating mode of step S47. In step S48 the rotation of the head and yoke are then limited to the determined maximum and minimum angles during use. In the operating mode control signals for the tilt and pan rotation may be received from input signal 123. The control signals are then interpreted such that the tilt or pan rotation is limited to the values manually input as described above. The method ends in step S49.

In the above described example an effective way is obtained to limit the movement of a moving head light fixture to a certain area. There is no need for an extra hardware except a Hall effect sensor which can be used to determine the pan and tilt angles relative to a referenced position and physical or virtual buttons provided that might be used to confirm the corresponding maximum and minimum tilt and pan rotation angles.

Different options exist to determine the angle range within which the components can be rotated.

It is possible that the calibration mode is entered when a first predefined user interaction is detected wherein the position of the yoke at the minimum pan rotation angle as positioned by the user in the first position is detected when a second predefined user interaction is detected. Accordingly after the first user interaction the calibration mode is entered and then the user moves the head to a position corresponding to the minimum pan rotation angle and carries out another predefined user interaction which is detected by the system and from which it can be deduced that this angle should be the minimum pan rotation angle.

In the same way, the position of the yoke can be detected at the maximum pan rotation angle as positioned by the user in another, a second position when a third predefined user interaction is detected. The second and the third predefined user interaction can be the pressing of a single operating element a first time for the minimum pan rotation and the second time for the maximum pan rotation. For the maximum pan rotation, also a separate or other operating element may be provided in order to confirm the maximum pan rotation angle.

When the calibration mode is entered and when a first predefined user interaction is detected the minimum tilt rotation angle may be detected as positioned by the user in the third position when a forth predefined user interaction is detected.

Furthermore, the position of the head at the maximum tilt rotation angle can be detected as positioned by the user in a fourth position when a fifth predefined user interaction is detected.

In this example a separate user interaction is provided for each of the different angles. The user interaction can be the pressing of one or several operating elements and the sequence of the activation can indicate which of the rotation angles, be it the minimum or maximum pan rotation angle or the minimum or maximum tilt rotation angle is meant, when not a single operating element is provided for each angle.

As discussed above in the other example two single positions were used to limit the rotation as discussed in connection with FIG. 2.

One option is to use a single operating element to be activated by the user when the minimum pan rotation angle and the minimum tilt rotation angle is selected. In the same way a single second operating element may be used to determine the maximum pan rotation angle and the maximum tilt rotation angle upon detecting that this second operating element is operated by the user.

The entering of the calibration mode can be detected when one of these operating elements is operated by the user, be it the minimum or maximum operating element first.

For each of the determined angles it is possible to determine a corresponding amount of rotation relative to a referenced position.

It should be understood that the determined and needed angles are not the theoretical maximum values which could be obtained by the light fixture. The rotation angles as set by the user by moving the moving head light fixture are smaller than the theoretical maximum or minimum values for the pan or tilt rotation.

The user obtains a very easy way to define where the focus area will be so that a better light experience is provided.

The control methods and routines disclosed herein may be stored as executable instructions in non-transitory memory and may be carried out by the control system including the control unit in combination with the various sensors, actuators, and lighting system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the lighting control system, where the described actions are carried out by executing the instructions in a system including the various lighting hardware components in combination with the electronic control unit.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A moving head light fixture, comprising:
   a base,
   a yoke connected to the base and configured to be rotated relative to the base around a pan axis,
   a head connected to the base and configured to be rotated relative to the yoke around the tilt axis, a control unit configured to:
operate the moving head light fixture in a calibration mode used to determine a maximum needed rotation around the tilt axis and the pan axis in order to illuminate a target area, and operate in an operating mode in which the moving head light fixture illuminates the target area only within the maximum needed rotation,
control the movement of the yoke around the pan axis and of the head around the tilt axis,
determine that the calibration mode should be entered upon detection of a first predefined user interaction with the moving head light fixture, wherein in the calibration operating mode the control unit is configured to:
determine a minimum pan rotation angle of the yoke around the pan axis upon detecting that the user has moved the moving head light fixture to a first position,
determine a maximum pan rotation angle of the yoke around the pan axis upon detecting that the user has moved the moving head light fixture to a second position,
determine a minimum tilt rotation angle of the head around the tilt axis upon detecting that the user has moved the moving head light fixture to a third position,
determine a maximum tilt rotation angle of the head around the tilt axis upon detecting that the user has moved the moving light fixture to a fourth position,
wherein the control unit is further configured, when operating in the operating mode, to limit the rotation of the yoke around the pan axis to pan rotation angles in a range between the minimum pan and the maximum pan rotation angle, and to limit the rotation of the head around the tilt axis to tilt rotation angle in a range between the minimum tilt and the maximum tilt rotation angle independent of a control signal provided to the control unit for controlling the movement of the yoke and the head.

2. The moving head light fixture according to claim 1, wherein the control unit is configured to operate the head and the yoke such that a resistance to manually rotate the yoke around the pan axis and the head around the tilt axis is smaller in the calibration mode than in the operating mode.

3. The moving head light fixture according to claim 1, wherein the control unit is configured to:
determine that the calibration mode is entered when a first predefined user interaction is detected, and
detect the position of the yoke at the minimum pan rotation angle as positioned by the user in the first position when a second predefined user interaction is detected.

4. The moving head light fixture according to claim 1, wherein the control unit is configured to:
determine that the calibration mode is entered when a first predefined user interaction is detected, and
detect the position of the yoke at the maximum pan rotation angle as positioned by the user in the second position when a third predefined user interaction is detected.

5. The moving head light fixture according to claim 1, wherein the control unit is configured to:
determine that the calibration mode is entered when a first predefined user interaction is detected, and
detect the position of the head at the minimum tilt rotation angle as positioned by the user in the third position when a fourth predefined user interaction is detected.

6. The moving head light fixture according to any of the preceding claims, wherein the control unit is configured to:
determine that the calibration mode is entered when a first predefined user interaction is detected, and
detect the position of the head at the maximum tilt rotation angle as positioned by the user in the fourth position when a fifth predefined user interaction is detected.

7. The moving head light fixture according to claim 1, wherein the control unit is configured to:
determine that the calibration mode is entered when a first predefined user interaction is detected,
detect the position of the head and the yoke as the minimum pan rotation angle and the minimum tilt rotation angle upon detecting that the user has moved the moving head light fixture to a single first position corresponding to the first and third position, when a second predefined user interaction is detected.

8. The moving head light fixture according to claim 1, wherein the control unit is configured to:
determine that the calibration mode is entered when a first predefined user interaction is detected,
detect the position of the head and the yoke as the maximum pan rotation angle and the maximum tilt rotation angle upon detecting that the user has moved the moving head light fixture to a single second position corresponding to the second and fourth position, when a third predefined user interaction is detected.

9. The moving head light fixture according to claim 7 further comprising a first operating element for the user, the control unit being configured to determine the minimum pan rotation angle and the minimum tilt rotation angle upon detection that the first operating element is operated by the user.

10. The moving head light fixture according to claim 8, further comprising a second operating element for the user, the control unit being configured to determine the maximum pan rotation angle and the maximum tilt rotation angle upon detection that the second operating element is operated by the user.

11. The moving head light fixture according to claim 9, wherein the control unit is configured to detect that the calibration mode should be entered when either the first or second operating element is operated by the user.

12. The moving head light fixture according to claim 1, wherein the control unit is further configured to determine for each of the minimum pan rotation angle, maximum pan rotation angle, minimum tilt rotation angle and maximum tilt rotation angle, a corresponding amount of rotation relative to a reference position of the head relative to the base and the yoke.

13. The moving head light fixture according to claim 1, wherein the control unit is further configured to determine that the moving head light fixture should keep the light beam exiting the light fixture located at a fixed reference position upon detection of a sixth user interaction.

14. The moving head light fixture according to claim 1, wherein the minimum pan rotation angle is smaller than a theoretical minimum pan rotation angle by which the yoke could be rotated around the pan axis, and the maximum pan rotation angle is smaller than a theoretical maximum pan rotation angle, by which the yoke could be rotated around the pan axis, wherein the minimum tilt rotation angle is smaller than a theoretical minimum tilt rotation angle by which the head could be rotated around the tilt axis, and the maximum tilt rotation angle is smaller than a theoretical maximum tilt rotation angle, by which the head could be rotated around the tilt axis.

15. A method for operating a moving head light fixture which comprises a base, a yoke connected to the base and configured to be rotated relative to the base around a pan axis, a head connected to the yoke and configured to be rotated relative to the yoke around a tilt axis, and a control unit configured to operate the moving head light fixture in a calibration mode used to determine a maximum needed rotation around the tilt and the pan axis in order to illuminate a target area, and in an operating mode in which the moving head light fixture illuminates the target area only within the maximum needed rotation, the method comprising:

determining that the calibration mode should be entered upon detection by a control unit of an interaction of a user with the moving head light fixture, and when operating in the calibration mode:

determining a minimum pan rotation angle of the yoke around the pan axis upon detecting that the user has moved the moving head light fixture to a first position, determining a maximum pan rotation angle of the yoke around the pan axis upon detecting that the user has moved the moving head light fixture to a second position, determining a minimum tilt rotation angle of the head around the tilt axis upon detecting that the user has moved the moving head light fixture to a third position, determining a maximum tilt rotation angle of the head around the tilt axis upon detecting that the user has moved the moving light fixture to a fourth position, and when operating in the operating mode:

limiting a rotation of the yoke around the pan axis to pan rotation angles in a range between the minimum pan and the maximum pan rotation angle, and limiting the rotation of the head around the tilt axis to tilt rotation angles in a range between the minimum tilt and the maximum tilt rotation angle independent of a control signal provided to the control unit for controlling the movement of the yoke and the head.

\* \* \* \* \*